May 21, 1957 A. A. ROOT 2,793,136
SLIP-RESISTANT SURFACES AND PROCESSES FOR MAKING THE SAME
Filed Oct. 8, 1953 2 Sheets-Sheet 2
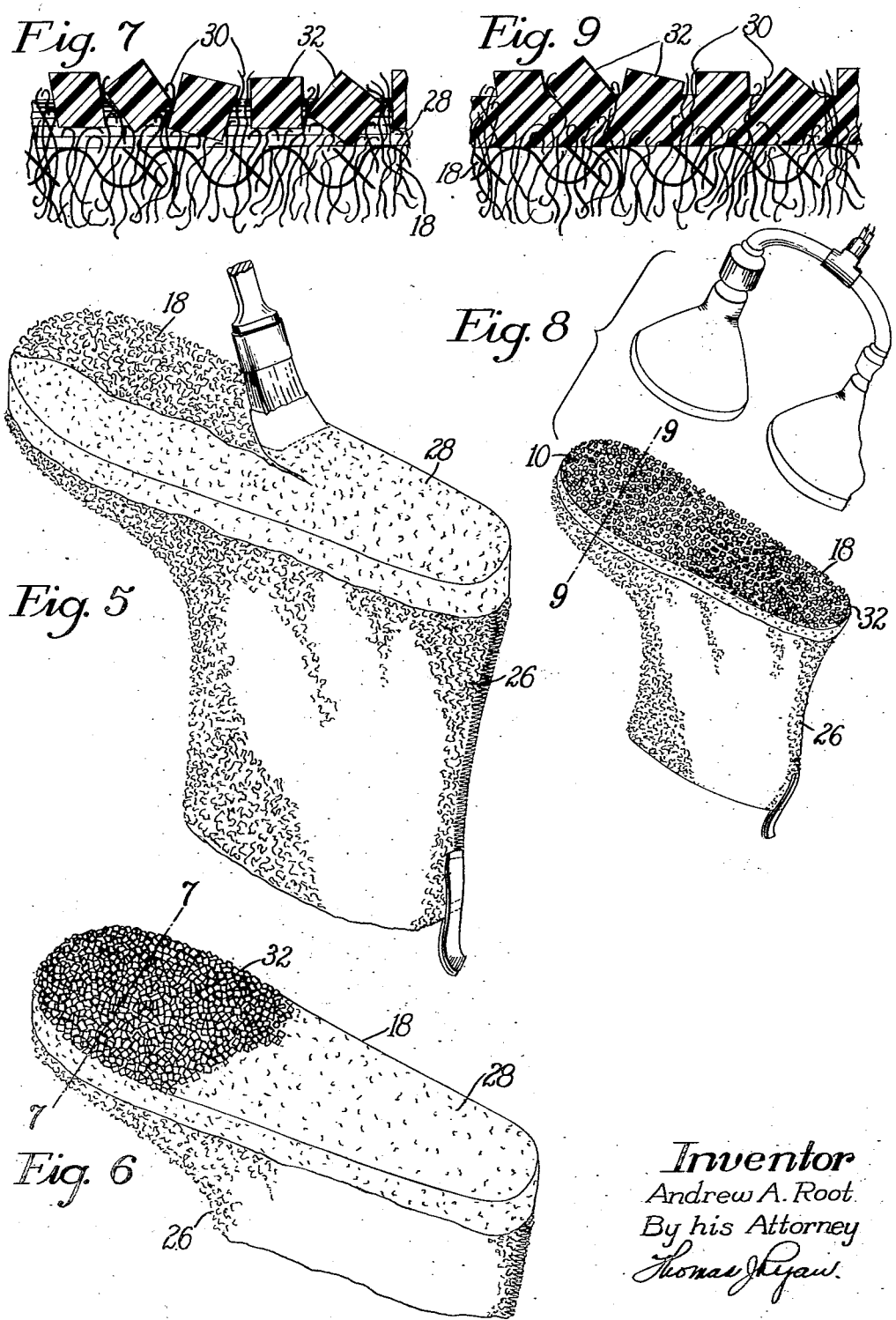
Inventor
Andrew A. Root
By his Attorney

United States Patent Office 2,793,136
Patented May 21, 1957

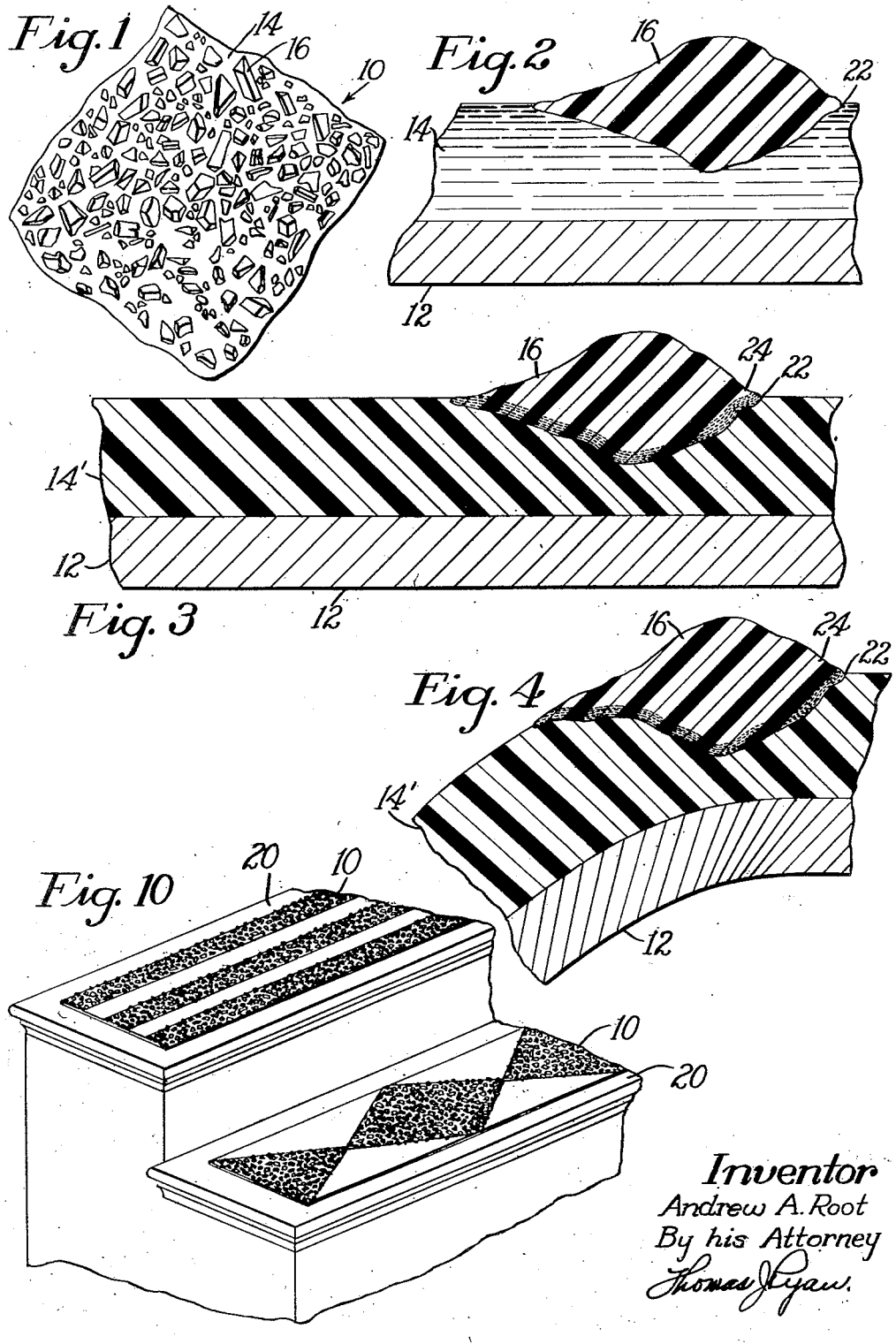

2,793,136

SLIP-RESISTANT SURFACES AND PROCESSES FOR MAKING THE SAME

Andrew A. Root, Wenham, Mass., assignor to United Shoe Machinery Corporation, Flemington, N. J., a corporation of New Jersey Application October 8, 1953, Serial No. 385,019

5 Claims. (Cl. 117—33)

This invention relates to slip-resistant surfaces particularly suitable for articles of footwear and to a method of forming the same.

This application is a continuation-in-part of my copending application Serial No. 213,495, of March 2, 1951, (now abandoned) entitled "Slip-Resistant Coatings and Processes for Making the Same."

In general, slip-resistant surfaces as heretofore known have involved either ridges and other protrusions formed from the material of and integral with the body of a contact surface, or sharp particulate material partially embedded in such surface. Ridges formed integrally with a contact surface are ordinarily of the same material as the body of the contact surface and hence the material selected represents a compromise between substances hard and wear-resistant enough to continue to present relatively sharp slip-resistant edges and substances tough and resilient enough to provide a body portion which will withstand other stresses. In such a compromise it is inevitable that either the ridges or the body portion of the contact surface have properties less than the optimum desirable properties for their particular functions.

Surfaces which include particulate material possess the advantage that the protuberant material may be selected for optimum properties of slip-resistance and the body portion of matrix in which the material is partially embedded may be selected to provide optimum properties for its function. The point of weakness in a particulate material surfaced structure is the bond between the particulate material and the body or matrix. Particularly where the matrix must be flexible as for example in the soles of shoes, no entirely satisfactory combination of flexible base material and particulate material has heretofore been found in which the particulate material is retained sufficiently well to provide for long periods of time a slip-resistant surface.

It is a feature of the present invention to provide a slip-resistant surface and method of making it wherein particles of a resin-like plastic are integrally united to a flexible resin-like plastic base.

In accordance with the present invention I have formed a new slip-resistant surfacing by anchoring angular or rough resin granules in antislip array in a tough resilient resin supporting matrix with which the granules are integrally united in an unusual relationship. Portions of the granules extend well above the free surface of the matrix and the matrix has a thickness greater than the height to which said granules extend above the surface of the matrix and at least of the order of the thickness of the particles. The resin granules may have the same or greater or less hardness than the matrix by reason of having respectively the same or less or greater plasticizer content than the matrix. In the special relationship in the present article no boundary remains between the resin of the granule and of the matrix and where the granules have greater or less hardness than the matrix there exist union strata in which the hardness progressively increases from the value of the resin body richer in plasticizer to that of the resin body poorer in or free of plasticizer. In none of these cases is there a sharp change in hardness which might localize separation stresses. The granules maintain their original non-skid physical characteristics in portions spaced from the matrix and are firmly but resiliently held in attitudes in which they can function most efficiently to resist slip by the relatively thick, tough, resilient, supporting matrix.

The slip-resistant surfacing is formed according to the present invention by providing a relatively thick layer of a fluid dispersion of finely divided resin particles in a liquid plasticizer in which the resin is not dissolved to a substantial extent when cold but is dissolved when the dispersion is heated, distributing angular or rough resin granules on said layer with portions of the granules projecting above the surface of said layer to a substantial extent and other portions projecting into said layer, and heating the dispersion and resin granules. The resin dispersion layer, which should have a thickness substantially greater than the height to which the granules extend above its surface and at least of the order of the thickness of the particle, is solidified by the heating through the solvent action of the plasticizer on the fine particles of the dispersion to form a tough resilient sheet-like body. The plasticizer component of the dispersion also acts on the surface of the resin granules and integrally unites the resin granules with the solidified sheet-like body of resin. The relatively thick sheet of resin dispersion firmly but resiliently supports the resin granules in the position in which they were spread on the surface of the layer of dispersion with edges or points of the granules disposed to function most efficiently to resist slipping of surfaces past them.

The invention will be further described in connection with the accompanying drawings forming part of the disclosure, in which:

Fig. 1 is a plan view of a slip-resistant surface according to the present invention;

Fig. 2 is an enlarged sectional view illustrating a resin granule on and in the surface of a body of fluid resin dispersion prior to integration with said body;

Fig. 3 is an enlarged sectional view corresponding to Fig. 2 illustrating the resin granule after integration into the body of resin;

Fig. 4 is an enlarged section corresponding to Fig. 3 illustrating the action on the integrated resin granule and body of resin when bent;

Fig. 5 is an angular view illustrating the initial coating step in the formation of a slip-resistant surface on an article of footwear;

Fig. 6 is an angular view illustrating the coated surface of an article of footwear with a portion of the coated surface covered with slip-resistant particles;

Fig. 7 is an enlarged sectional view taken on the line 7—7 of Fig. 6;

Fig. 8 is an angular view illustrating the step of setting up a coated and granule-coated surface of an article of footwear;

Fig. 9 is an enlarged sectional view taken on the line 9—9 of Fig. 8; and

Fig. 10 is an angular view illustrating stair treads provided with a slip-resistant surface according to the present invention.

The formation of firmly adherent resin surfaces on articles of footwear by confining a fluid body of resin dispersion on the exposed surface of an article and curing the resin dispersion is described in my United States Patent No. 2,651,118 of September 8, 1953, which was copending with the parent application Serial No. 213,495 (now abandoned) of the present application.

The slip-resistant surface 10 of the present invention (see Fig. 1) may be formed on a variety of objects by coating or impregnating a surface 12 (see Fig. 2) with a relatively thick layer 14 of a fluid dispersion of finely divided resin particles in a liquid plasticizer and thereafter distributing angular or rough, plasticized or unplasticized resin granules 16 on or in the resin dispersion and heating the dispersion to solidify it. The process is extremely adaptable since it may be practiced with a minimum of equipment to form a slip-resistant surface on the ultimate section where the surface is required. Thus slip-resistant surfaces may be formed on the soles 18 of shoes or other footwear (see Fig. 8), and may also be formed directly on stair treads 20 (Fig. 10) or on flooring or on handholds at the ultimate locations. Additionally, slip resistant sheet material may be formed on a smooth surface from which it may be stripped.

For this wide range of applications it is only necessary to provide on a surface 12 (see Figs. 1 and 2) a relatively thick layer 14 of resin dispersion by the conventional method best suited to the particular article. Small articles may be dipped in the dispersion. Sheet material may be coated on a coating machine such as a knife applicator. Other surfaces may be coated by brushing or spraying. Thicker coatings may be formed by confining a body of dispersion against a surface within retaining walls or within a mold. The layer of dispersion may be a coating or, particularly with relation to open fibrous articles, may be a partial or complete impregnation. The layer should have a thickness greater than the height to which said granules extend above the surface of the matrix and at least of the order of thickness of the particles as measured between planes parallel to the matrix. This thickness is important in order that the granules may be supported resiliently and that the matrix may have sufficient body to resist the turning momen of the granules.

The resinous granules 16 are deposited on or in the body of dispersion 12 by any convenient method as by hand sprinkling or sifting or the like. It is important that the granules enter the body of dispersion to at least a limited extent to provide a sufficient area of union. In general it has been found that a penetration to the extent of about one-fifth or more of the thickness of the granule will give a firm anchorage holding the granules in slip-resistant array.

The surface of the body 14 of resin dispersion with granules 16 therein is subjected to heating to convert the resin dispersion to a solid body 14 and to unite the granules 16 integrally with the solidified resin dispersion. The heating may be effected in various ways such as by subjecting the surface to heat from an infrared lamp or by placing the assembly in a heating chamber. The heating required involves bringing the resin material to a temperature sufficient to cause solution and/or gelling of the dispersed resin particles by the plasticizer and maintaining the dispersion at this temperature after the temperature is attained by the resinous material until gelling is complete, usually from 5 to 20 minutes. It has also been found that satisfactory heating may be obtained by the action of a high-frequency electric field acting on the dispersion as more fully described in my copending application above referred to.

The surface after heating possesses excellent flexibility and resistance to wear and the granules 16 of resin are integrally bonded therein so that they are not removable without destruction of the solidified body 14' of resin dispersion. As shown more clearly in Figs. 3 and 4, plasticizer from the dispersion enters into the surface portions 22 of the granules 16 adjacent the body 14' of solidified resin dispersion to plasticize those portions and bring them to the condition ranging from approximately as soft as the body 14' of solidified resin dispersion at the initial boundary 22 between the granule 16 and the resin dispersion 14 to a condition possessing substantially the original hardness of the granule at portions 24 further away from the initial boundary. Where the resin of the granules and of the finely divided resin particles of the dispersion are of the same general type, complete integration between the solidified resin dispersion and the granule occurs at the original juncture between them so that there is no line of cleavage. Furthermore, since the hardness of the granule varies progressively from a hardness equal to that of the solidified resin dispersion to initial hardness, flexing stresses on the composite material are distributed as shown in Fig. 4 and hence there is no tendency for cracking to develop at the original juncture 22 between the granule 16 and the resin dispersion 14.

Resin dispersions employed in the method and article of the present invention may be liquid to pasty mixtures of from 30% to 70% of thermoplastic resin particles in from 70% to 30% of a liquid plasticizer having no substantial solvent action on the resin when cool, but capable of combining physically with the resin particles when the dispersion is heated to form a uniform mass of plasticized resin. For ease of application, the dispersion may be thinned by addition of volatile organic solvent. The relative proportions of resin and plasticizer selected will depend on the physical properties desired in the final surface. For example, high relative proportions of plasticizer will give a softer more rubbery material than lower relative proportions within the above range.

The particle size of the dispersed resin may vary within relatively wide limits. However, particles of from 275 to 325 microns have been found very satisfactory.

Resins which have been found satisfactory for the finely divided dispersed resin include copolymers of vinyl chloride and vinyl acetate containing from 85% to 88% of vinyl chloride (Vinylite VYNS), a vinyl chloride-vinyl acetate copolymer known as Geon 100X 210, polyvinyl chloride, polymethyl methacrylate, and vinyl chloride-vinylidene chloride copolymers (Saran).

Suitable combinations of finely divided resin and plasticizer for use in the resin dispersions may be equal proportions of finely divided Vinylite VYNV and dioctyl phthalate, and substantially equal proportions of Geon 100X 210 and an ester type plasticizer such as tricresyl phosphate, dibutyl phthalate or dioctyl phthalate. It has been found desirable in these dispersions to use about 1% of a stabilizer such as the material known as Advance Solvents Stabilizer SN.

The dispersion may also include any compatible dye or pigment or combination of these and may also include finely divided or fibrous fillers.

Granules 16 for distribution on or within the body of resin dispersion may vary in size. It is preferred to use granules which range in size from at little as 1/16 of an inch up to 1/2 of an inch or more in diameter, and which may be rough and irregular or may be angular with slip-resistant edges. It is important that the particles possess a substantial size in order that they may project physically from the resin layer to a sufficient extent to provide the necessary roughened surface characteristics. Particularly where the granules are composed of unplasticized resin and where it is desired that the projecting portions be as hard as possible, the size range given is important in order that the granules may not be softened throughout their entire extent by penetration of plasticizer. As noted, the portions of the granules adjacent the resin layer are softened by the plasticizer and the hardness of the granule increases until at portions spaced further away from the resin layer the granule retains its original hardness. Particles below the range given may be penetrated with plasticizer throughout and may not present the hard portions which are desirable in certain instances. The structure including granules with hard surface portions represents an unusually desirable embodiment since it combines the factors of hard slip-resistant portions, a thick linking portion in which the hardness varies from the original hardness to the softness of the resin layer to distribute separating stresses and a resilient layer or matrix which possesses sufficient body to hold the granules in slip-resistant array together with resilience which provides both better anti-slip action and a measure of protection of the granules against excessive wear. In general, the granules may be of the same types of resin as the resin particles of the dispersion.

Numerous variations in the process for forming slip-resistant surfaces may be employed. Thus the body 14 of resin dispersion may be partially cured prior to distributing the granules 16 on its surface and curing completed thereafter. Likewise, granules of harder resin may be distributed through the body of resin dispersion so that as the surface is worn down, new portions of the granules become exposed to provide a new slip-resistant roughness throughout the life of the surface.

As above described, the process has involved the securing of harder granules, e. g. of unplasticized resinous materials in a softer matrix. However, it is within the spirit of the invention to employ granules of the same softness as, or greater softness than, the solidified resin dispersion. These granules may comprise plasticized resinous materials, for example comminuted portions of scrap cured or partially cured resin dispersion.

The following examples are given as of possible assistance in understanding the invention, but it is to be understood that the invention is not restricted to the specific material or specific procedures set forth in the examples.

*Example I*

The sole 18 of a heavy woolen muk-luk 26 (see Fig. 5) was given a coating 28 of a resin dispersion comprising equal parts by weight of particles of a copolymer of vinyl chloride and vinyl acetate containing from 85% to 88% of vinyl chloride (Vinylite VYNV) dispersed in dioctyl phthalate. The resin particles had an average size of approximately 300 microns. The coating 28 was of sufficient thickness to impregnate the wool felt sole 18 to a depth of about ⅛ of an inch, but fibers 30 of the wool projected up from the main surface after the coating (see Fig. 7). On this surface there were sprinkled (see Figs. 6 and 7) particles 32 averaging about ⅛ of an inch in thickness of vinyl chloride-vinyl acetate copolymer resin containing from 85% to 88% vinyl chloride and plasticized with an equal weight of dioctyl phthalate. The coating 28 and granules 32 were then heated by an infrared lamp (see Fig. 8) to a temperature between 300 and 325° and were held at this temperature for approximately ten minutes. The muk-luk 26 was then cooled and it was found that the coating 28 of resin dispersion had solidified and that the macro particles 32 of resin were integrally joined to the main body of solidified resin dispersion as shown in Fig. 9.

*Example II*

On the surface of a polished aluminum sheet there was deposited a 3/16 inch layer of a resin dispersion comprising equal parts by weight of a copolymer of vinyl chloride and vinyl acetate containing from 85% to 88% of vinyl chloride dispersed in dioctyl phthalate. The resin particles had an average size of approximately 300 microns. Unplasticized vinyl chloride-vinyl acetate copolymer resin was broken into rough granules ranging in thickness from about 1/16 of an inch to 3/16 of an inch and these granules were sprinkled on the surface of the layer of resin dispersion. The aluminum sheet with the coating of dispersion and granules was then introduced into an oven in which the temperature was maintained between 325 to 360° F. and were kept in the oven for approximately 15 minutes. The aluminum sheet with the dispersion and granules thereon was then removed from the oven and cooled. The resin dispersion was found to have solidified to a resilient sheet in which the resin granules were firmly held. The solidified resin sheet was then stripped from the aluminum sheet. It was found on cutting a section through the resilient resin sheet that the portions of the resin granules adjacent the dispersion had been plasticized and had a softness approximating that of the resilient sheet formed from the solidified dispersion. The hardness progressively increased within each granule at points further removed from the original interface between the granule and the dispersion, and portions of the granules away from the solidified dispersion had essentially their original hardness.

Having thus described my invention, what I claim as new and desire to secure by Letters Patent of the United States is:

1. The method of forming a resilient slip-resistant article which comprises providing a layer of a fluid dispersion of finely divided vinyl polymer resin particles in a liquid plasticizer in which the resin is not dissolved to a substantial extent when cold but is dissolved when the dispersion is heated, disposing in contact with a free surface of said layer of dispersion hard granules of an unplasticized resin not substantially penetrated by said plasticizer when cold but capable of penetration by said plasticizer when said layer of dispersion is heated, said layer of dispersion having a thickness at least of the order of the thickness of said resin granules, and said resin granules being from 1/16 of an inch to ½ of an inch in thickness and being disposed with portions projecting substantially above the surface of said layer and other portions projecting into said layer, and heating the dispersion to cause at least partial solution of said particles in said plasticizer and to cause said plasticizer to penetrate surface portions of the granules in contact with said layer to convert the dispersion to a solid resilient layer and to soften the surface portions of said granules and unite the softened portions of the granules of resin to said resilient layer, said softened portions forming a thick resin link increasing in hardness progressively from the plasticizer-rich state adjacent said resin layer to substantially the original hardness at portions farther away from the resin layer to hold the granules resiliently in projecting slip-resistant relationship to the surface of said layer and to distribute separating stress over the thick link between the granules and the resin layer.

2. The method of forming a resilient slip-resistant article which comprises providing a layer of a fluid dispersion of finely divided vinyl polymer resin particles in a liquid plasticizer in which the resin is not dissolved to a substantial extent when cold but is dissolved when the dispersion is heated, disposing in contact with a free surface of said layer of dispersion granules from about 1/16 of an inch to about ½ of an inch in thickness of a vinyl polymer resin not substantiallly penetrated by said plasticizer when cold but capable of being acted on by said plasticizer when said layer of dispersion is heated, said layer of dispersion having a thickness at least of the order of the thickness of said granules, and said resin granules being disposed with portions projecting substantially above the surface of said layer and other portions projecting into said layer, and heating the dispersion to cause at least partial solution of said particles in said plasticizer and to cause said plasticizer to act on surface portions of the granules in contact with said layer to convert the dispersion to a solid resilient layer and to unite the granules of resin to said resilient layer to hold them resiliently in projecting slip-resistant relationship to the surface of said layer.

3. A resilient article presenting a slip-resistant surface and comprising a relatively soft resilient layer of plasticized polymer resin and hard unplasticized vinyl polymer resin granules of from 1/16 of an inch to ½ of an inch in thickness in projecting relation to said layer and in integral union with said resin layer throughout the area of engagement with said resin layer, said resin layer having a thickness at least of the order of the thickness of said resin granules and constituting a tough continuous matrix resiliently supporting and maintaining said granules with portions projecting in slip-resisting relation to the surface of said layer, the resin of the surface portions of the granules in engagement with said resin layer being penetrated by plasticizer from said layer and constituting a continuous thick resin link between said layer and the unpenetrated portions of the granules, the hardness of said link increasing progressively from a relatively soft plasticizer-rich state adjacent said resin layer to substantially the original hardness of the granules at portions farther away from the resin layer, whereby stress applied to projecting portions of the granule is distributed over the softened thick link between the granule and said resin layer.

4. A resilient article presenting a slip-resistant surface and comprising a relatively soft resilient layer of plasticized vinyl polymer resin and vinyl polymer granules from $\frac{1}{16}$ of an inch to $\frac{1}{2}$ of an inch in thickness in projecting relation to said layer and in integral union with said resin layer throughout the area of engagement with said resin layer, said resin layer having a thickness at least of the order of the thickness of said resin granules and constituting a tough continuous matrix resiliently supporting and maintaining said granules with portions projecting in slip-resisting relation to the surface of said layer, the resin of the surface portions of the granules in engagement with said resin layer being acted on by plasticizer from said layer and constituting a continuous thick resin link between said layer and the unaffected portions of the granules, whereby stress applied to projecting portions of the granule is distributed over the thick link between the granule and said resin layer.

5. An article of footwear comprising a porous sole member, a continuous plasticized resilient vinyl polymer resin layer bonded to said sole member, and vinyl polymer resin granules from $\frac{1}{16}$ of an inch to $\frac{1}{2}$ of an inch in projecting relation to said layer and in integral union with said resin layer throughout the area of engagement, said resin layer having a thickness at least of the order of the thickness of said resin granules and constituting a tough continuous matrix resiliently supporting and maintaining said granules with portions projecting in slip-resisting relation to the surface of said layer, the resin of the surface portions of the granules in engagement with said resin layer being acted on by plasticizer from said layer and constituting a continuous thick resin link between said layer and the unaffected portions of the granules, whereby stress applied to projecting portions of the granule is distributed over the thick link between the granule and said resin layer.

References Cited in the file of this patent
UNITED STATES PATENTS

| | | |
|---|---|---|
| 1,973,748 | Caldwell | Sept. 18, 1934 |
| 2,489,466 | Schramm | Nov. 29, 1949 |
| 2,513,434 | Tinsley | July 4, 1950 |
| 2,603,575 | Schramm | July 15, 1952 |
| 2,633,434 | Tanner | Mar. 31, 1953 |

OTHER REFERENCES

"British Plastics," April 1948, pp. 167–171.